United States Patent
Aoki

(10) Patent No.: US 12,204,073 B2
(45) Date of Patent: Jan. 21, 2025

(54) SCALE AND MANUFACTURING METHOD OF THE SAME

(71) Applicant: MITUTOYO CORPORATION, Kanagawa (JP)

(72) Inventor: Toshihiko Aoki, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 429 days.

(21) Appl. No.: 17/244,243

(22) Filed: Apr. 29, 2021

(65) Prior Publication Data

US 2021/0247547 A1    Aug. 12, 2021

Related U.S. Application Data

(62) Division of application No. 16/207,411, filed on Dec. 3, 2018, now abandoned.

(30) Foreign Application Priority Data

Dec. 5, 2017  (JP) .................... 2017-233154

(51) Int. Cl.
*G02B 1/14* (2015.01)
*G01D 5/347* (2006.01)
*G02B 1/18* (2015.01)

(52) U.S. Cl.
CPC ........... *G02B 1/14* (2015.01); *G01D 5/34707* (2013.01); *G02B 1/18* (2015.01)

(58) Field of Classification Search
None
See application file for complete search history.

(56) References Cited

U.S. PATENT DOCUMENTS

| | | | |
|---|---|---|---|
| 6,706,354 B1 | 3/2004 | Otaki | |
| 6,762,880 B2 * | 7/2004 | Holm | G02B 5/1866 359/569 |
| 8,801,946 B2 * | 8/2014 | Zhu | G03F 7/0037 216/24 |
| 2002/0089750 A1 | 7/2002 | Hoshi | |
| 2002/0191286 A1 | 12/2002 | Gale et al. | |
| 2004/0012793 A1 | 1/2004 | Schubert | |
| 2005/0017158 A1 | 1/2005 | Kojima | |
| 2006/0210767 A1 * | 9/2006 | Yoshitomi | G02F 1/133502 428/1.31 |

(Continued)

FOREIGN PATENT DOCUMENTS

| | | |
|---|---|---|
| CN | 102598223 A | 7/2012 |
| EP | 2124075 A1 | 11/2009 |
| JP | 05-332792 | 12/1993 |

(Continued)

OTHER PUBLICATIONS

Chinese Office Action with English translation dated Aug. 18, 2021, Application No. 201811472803.1, 15 pages.

(Continued)

*Primary Examiner* — Stephanie P Duclair
(74) *Attorney, Agent, or Firm* — Rankin, Hill & Clark LLP

(57) ABSTRACT

A scale includes: a substrate; scale gratings that are formed on a face of the substrate and has a plurality of gratings at a predetermined interval; and a protective layer that is made of fluoride and covers the scale gratings and an exposed portion of the face of the substrate.

5 Claims, 4 Drawing Sheets

(56) References Cited

U.S. PATENT DOCUMENTS

2011/0108861 A1*  5/2011  Smith ................... H01L 33/20
                                                    438/38
2017/0205547 A1   7/2017  Lochbihler

FOREIGN PATENT DOCUMENTS

| JP | H07-023222 U  | 4/1995  |
|----|---------------|---------|
| JP | 2003-021547 A | 1/2003  |
| JP | 2004-053576 A | 2/2004  |
| JP | 2004-145064 A | 5/2004  |
| JP | 2008-256655   | 10/2008 |
| JP | 2009-281870 A | 12/2009 |
| JP | 2011-247600   | 12/2011 |
| JP | 2012-027007   | 2/2012  |
| JP | 2013-221818   | 10/2013 |
| JP | 2016-178312   | 10/2016 |

OTHER PUBLICATIONS

Japanese Office Action with English translation dated Sep. 21, 2021, Application No. 2017-233154, 9 pages.
Chinese Office Action with English Translation dated Jan. 6, 2022, 15 pages.
Chinese Office Action from corresponding Chinese Application No. 201811472803.1 issued Nov. 16, 2022, 23 pages.
Chinese Rejection Decision dated Apr. 29, 2022 with English Translation, 17 pages.

\* cited by examiner

SCALE AND MANUFACTURING METHOD OF THE SAME

CROSS-REFERENCE TO RELATED APPLICATION

This application is based upon and claims the benefit of priority of the prior Japanese Patent Application No. 2017-233154, filed on Dec. 5, 2017, the entire contents of which are incorporated herein by reference.

FIELD

A certain aspect of embodiments described herein relates to a scale and a manufacturing method of a scale.

BACKGROUND

A scale in which scale gratings are formed on a substrate is used in a displacement measurement device of an optical type (for example, see Japanese Patent Application Publication No. 2006-178312).

SUMMARY

A contaminant may adhere to the scale gratings of the scale. However, when the contaminant is wiped, the scale gratings may be damaged. The contaminant may be left in a recess between gratings. And so, there is disclosed a technology in which a protective layer covers the scale gratings (for example, see Japanese Patent Application Publication No. 2008-256655). However, the contaminant may adhere to the protective layer. It is difficult to remove the contaminant.

The present invention has a purpose of providing a scale and a manufacturing method of a scale in which adherence of a contaminant is suppressed and from which a contaminant is easily removed.

According to an aspect of the present invention, there is provided a scale including: a substrate; scale gratings that are formed on a face of the substrate and has a plurality of gratings at a predetermined interval; and a protective layer that is made of fluoride and covers the scale gratings and an exposed portion of the face of the substrate.

According to another aspect of the present invention, there is provided a manufacturing method of a scale including: forming a protective layer on a face of a substrate by a plasma polymerization, the substrate having scale gratings of a plurality of gratings arranged at a predetermined interval, the protective layer being made of fluoride and covering the scale gratings and an exposed portion of the face of the substrate.

DESCRIPTION OF EMBODIMENTS

Figure 1:
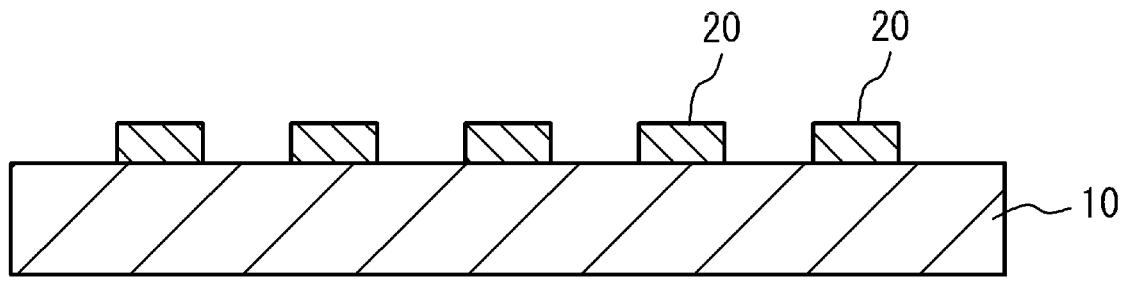
FIG. 1 illustrates a cross sectional view of a scale of a comparative embodiment.

[Comparative Embodiment] A description will be given of a comparative embodiment. FIG. 1 illustrates a cross sectional view of a scale 200 of the comparative embodiment. As illustrated in FIG. 1, the scale 200 has scale gratings 20 including a plurality of gratings that are arranged on a face of a substrate 10 at a predetermined interval. With the structure, the scale 200 achieves optical characteristic such as optical transparency or optical reflection.

A contaminant may adhere to the scale 200. The contaminant has influence on the optical characteristic of the scale 200. It is therefore preferable that the contaminant is removed. For example, it is thought that the contaminant adhering to a surface of the scale gratings 20 or an exposed portion of the scale 200 is wiped. However, when the contaminant is wiped, the scale gratings 20 may be damaged. Alternatively, the contaminant is left in a recess between gratings. In particular, when a distance between the gratings of the scale gratings 20 is small or a level difference formed by the gratings is large, the contaminant tends to be left. Therefore, measurement accuracy of a measurement device using the scale may be degraded.

And so, it is thought that the scale gratings 20 are covered by a protective layer. However, the contaminant may adhere to the protective layer. It is not easy to remove the contaminant. And it is difficult to suppress the adherence of the contaminant. In the following embodiment, a description will be given of a scale and a manufacturing method of the scale in which adherence of the contaminant is suppressed and from which the contaminant is easily removed.

Figure 2A:
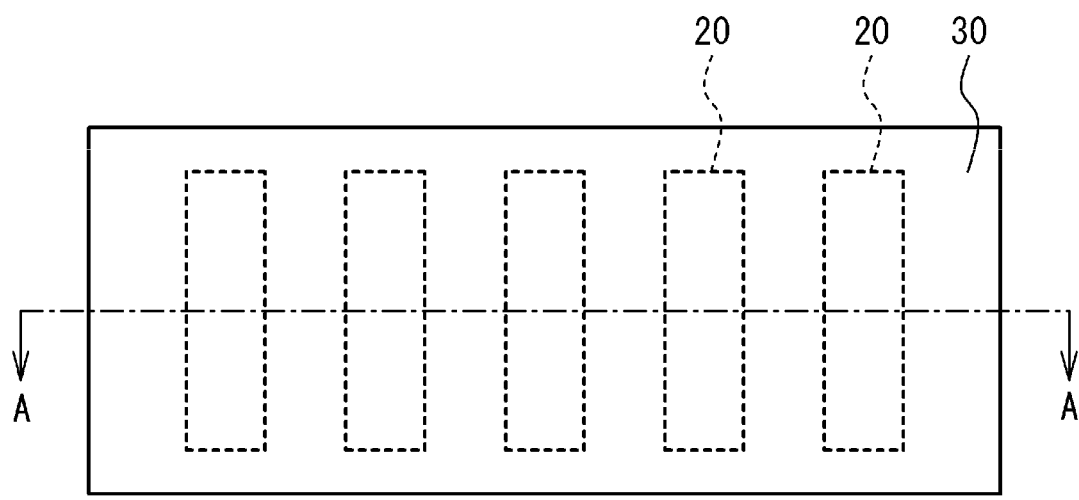
FIG. 2A illustrates a plan view of a scale in accordance with an embodiment.
Figure 2B:
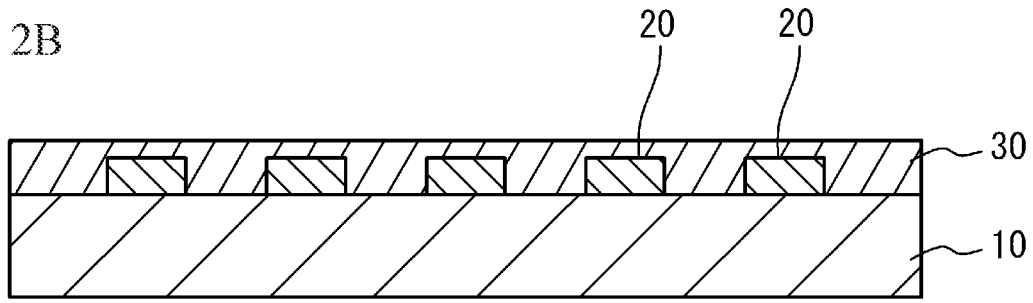
FIG. 2B illustrates a cross sectional view taken along a line A-A of FIG. 2A.

[Embodiment] FIG. 2A illustrates a plan view of a scale 100 in accordance with an embodiment. FIG. 2B illustrates a cross sectional view taken along a line A-A of FIG. 2A. As illustrated in FIG. 2A and FIG. 2B, the scale 100 has the scale gratings 20 in which a plurality of gratings are arranged on the face of the substrate 10 at a predetermined interval. An exposed portion on the face of the substrate 10 and the scale gratings 20 are covered by a protective layer 30. A surface of the protective layer 30 is flat or approximately flat.

The substrate 10 is not limited. When the scale 100 is an optical transparent type scale, the substrate 10 is made of an optical transparent material. The optical transparent material is such as glass. A low-expansion coefficient material such as quartz glass (synthetic molten quartz) may be used. When the scale 100 is a reflection type scale, the substrate 10 may be made of light non-transparent material. The non-transparent material in this case is such as metal or ceramic.

The scale gratings 20 are not limited. For example, the scale gratings 20 are made of an optimal optical transparent or non-transparent material (optical absorption or optical reflection) in accordance with a type such as a phase grating type, an amplitude grating type, a reflection type or optical transparent type. The optical transparent material may be a transparent oxide such as glass, silicon dioxide, titanium oxide, magnesium fluoride, or fluoride. The non-optical transparent material may be metal such as chromium, nickel, titanium silicide, copper, gold, aluminum or titanium, or a black plated layer, or a colored oxide layer.

The protective layer 30 is made of fluoride. As an example, the fluoride may be a fluorocarbon-based polymer. The fluorocarbon-based material may be tetrafluorocarbon or the like. The fluoride has water repellency property. Therefore, the fluoride has antifouling property. It is therefore possible to suppress adherence of a contaminant to the protective layer 30. A friction coefficient of the fluoride is relatively small. It is therefore possible to wipe the contaminant on the protective layer, even if the contaminant adheres to the protective layer 30. It is therefore possible to suppress adherence of the contaminant to the scale 100 in accordance with the embodiment. And, the scale 100 has a structure in which removal of the contaminant is easy. Moreover, the fluoride is excellent at chemical resistance. And, a refraction index of the fluoride is smaller than that of silicon dioxide. Therefore, the fluoride is excellent at interface reflection, optical performance and so on.

The protective layer 30 of fluoride is particularly effective in a scale having the scale gratings 20 of which a distance between gratings is 2 µm or less. When the surface of the protective layer 30 is flat or approximately flat, adherence of the contaminant is suppressed and is it easier to wipe the contaminant.

Figure 3A:
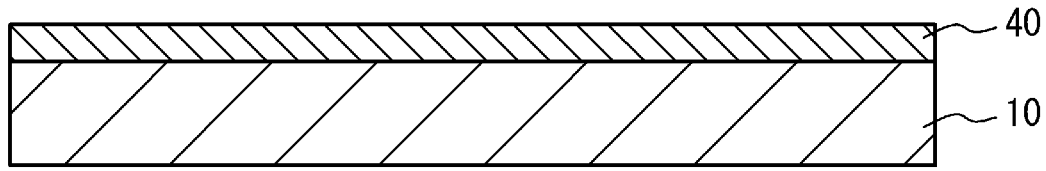
FIG. 3A to FIG. 3E illustrate a manufacturing method of a scale.

FIG. 3A to FIG. 3E illustrate a manufacturing method of the scale 100. As illustrated in FIG. 3A, a layer 40 to be etched is formed on the face of the substrate 10. The layer 40 to be etched is a layer for forming the scale gratings 20. Therefore, a material of the layer 40 to be etched is the same as that of the scale gratings 20. When the material of the substrate 10 is the same as that of the scale gratings 20, a part of the substrate 10 can be used as the layer 40 to be etched.

Figure 3B:
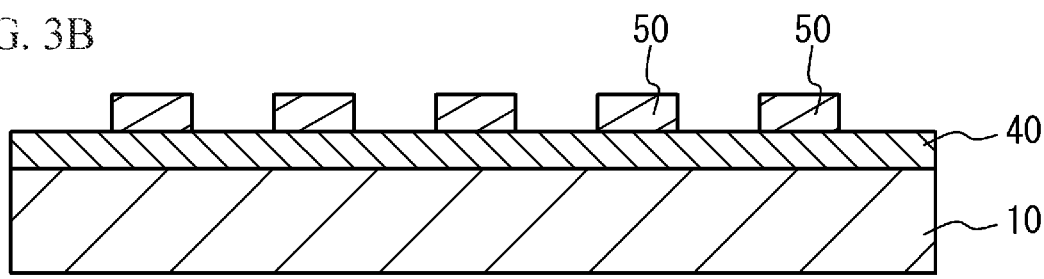
Figure 3C:
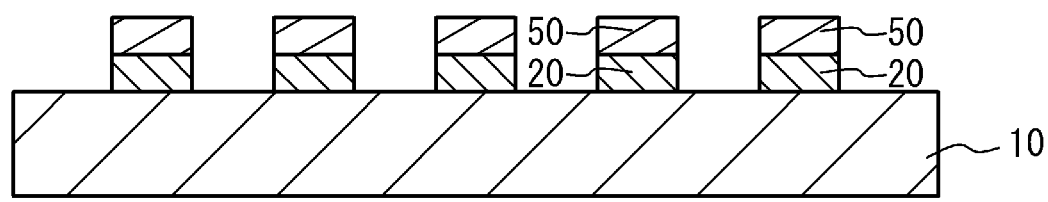

Next, as illustrated in FIG. 3B, resist patterns 50 are formed on the layer 40 to be etched at a predetermined interval. The resist patterns 50 have the same pattern as the scale gratings 20. It is possible to form the resist patterns 50 by etching a resist layer with use of a predetermined mask. Next, as illustrated in FIG. 3C, the resist patterns 50 are used as a mask. And the layer 40 to be etched is etched (etching process). Thus, the scale gratings 20 are formed.

Figure 3D:
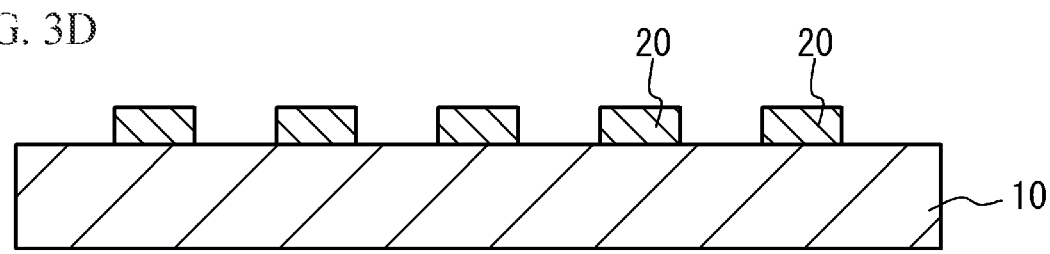
Figure 3E:
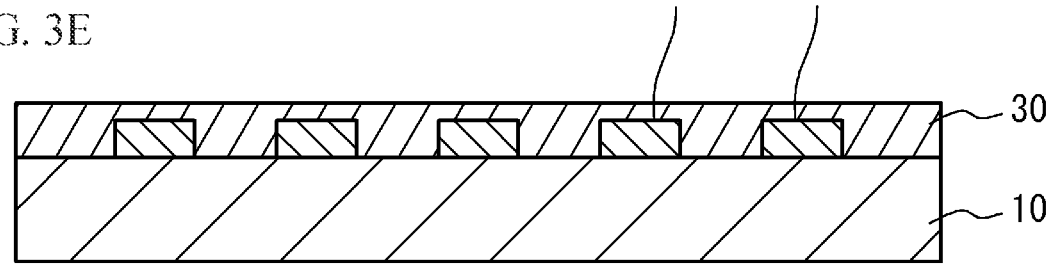

Next, as illustrated in FIG. 3D, the resist patterns 50 are removed. Then, as illustrated in FIG. 3E, the protective layer 30 is formed so as to cover an exposed portion on the face of the substrate 10 and the scale gratings 20 (forming process of layer). It is possible to form the protective layer 30 by a plasma polymerization under air atmosphere or under decompression. Fluoride gas may be used as material gas. Fluorocarbon gas such as $CF_4$, $C_3F_8$, $C_4F_8$ or $CHF_3$ may be used as the fluoride gas. It is preferable that the surface of the protective layer 30 is flat or approximately flat.

In the manufacturing method of the embodiment, it is possible to form the protective layer 30 of fluoride by the plasma polymerization of the fluoride gas. It is therefore possible to suppress adherence of the contaminant to the scale 100. And it is easy to remove the contaminant. Moreover, it is possible to reduce the thickness of the protective layer 30 by using the plasma polymerization. For example, it is possible to largely reduce the thickness of the protective layer 30, in comparison to the case where a resin protective layer is formed by coating. For example, it is possible to reduce the thickness of the protective layer 30 to 5 µm or less. From a viewpoint of easiness of layer formation, it is preferable that the thickness of the protective layer 30 is 3 µm or less. From a viewpoint of suppressing the influence of the protective layer 30 on optical characteristic of the scale 100 caused by variation of the thickness, it is more preferable that the thickness of the protective layer 30 is 50 nm to 1 µm. It is possible to fill a fluoride layer only between the gratings, by adjusting the condition of the plasma polymerization and performing etch-back after the formation of the protective layer. It is therefore possible to minimize degradation of the optical characteristic caused by the protective layer. The thickness of the protective layer 30 means a thickness from an upper face of the gratings to an upper face of the protective layer 30.

In a plasma etching device using fluoride gas such as the fluorocarbon gas acting as etching gas, the fluoride gas is decomposed by the plasma. And, an ion such as $CF^{2+}$ or $CF^{3+}$ or a radical such as F, CF, $CF_2$ or $C_2F_4$ is formed. Thus, etching of a surface of a target and covering of polymer on the surface of the target progress together with each other. When the operation condition of the plasma etching device is changed, the effect of the etching is enlarged or the effect of covering of the surface with the polymer is enlarged. For example, it is possible to enlarge the effect of the etching by enlarging a bias applied to the target. On the other hand, it is possible to reduce the effect of the etching caused by draw-in of ions and promote the covering of the surface with the polymer, by reducing the bias applied to the target.

And so, in the embodiment, a plasma etching device is used. In this case, it is possible to continuously perform the etching process of FIG. 3C, the removing process of the resist of FIG. 3D, and the covering process of FIG. 3E. That is, it is possible to continuously perform a series of the etching process, the removing process of the resist and the covering process with a single plasma etching device. And it is possible to continuously perform the series of the etching process, the removing process of the resist and the covering process under a condition that vacuum atmosphere is kept. And it is possible to perform the etching process and the covering process with similar or the same fluoride gas. In the removing process of the resist, it is possible to remove the resist by changing the gas to oxidizing gas such as oxygen.

Figure 4A:
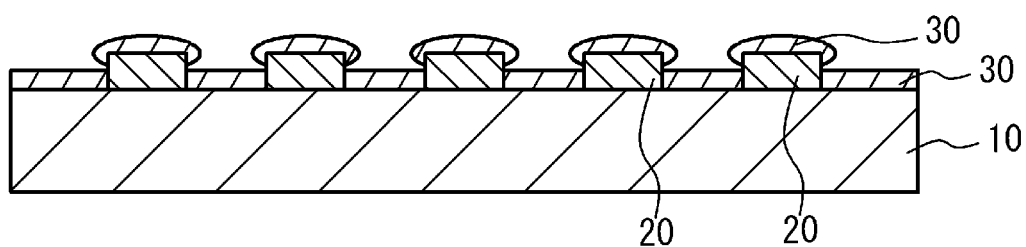
FIG. 4A and FIG. 4B illustrate another manufacturing method.
Figure 4B:
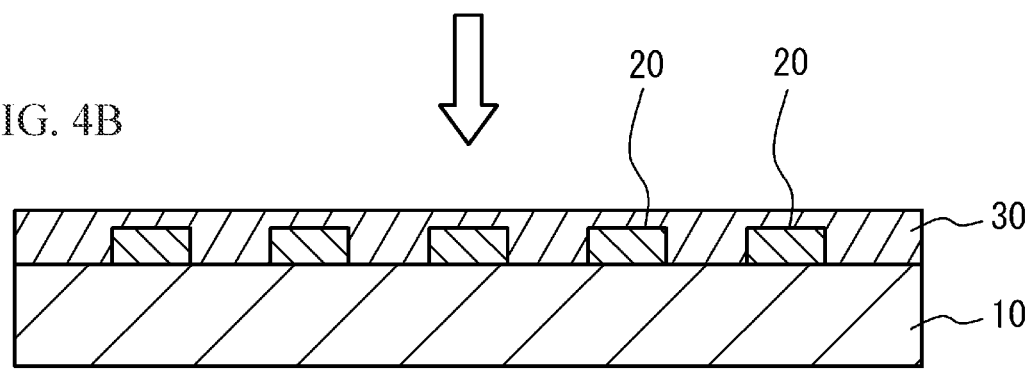

In the covering process with the fluoride polymer, as illustrated in FIG. 4A, the fluoride may be deposited on the upper face of the scale gratings 20 and it may not be necessarily possible to sufficiently fill the exposed portion of the face of the substrate 10 with the protective layer 30. For example, when the level difference caused by the scale gratings 20 is large, the filling of the exposed face of the substrate 10 may be prevented by a convex portion protruding from the upper face of the scale gratings 20 toward an in-plane direction of the substrate 10. And so, when the fluoride gas includes a slight amount of $O_2$ or an exposing process by $O_2$ plasma is performed on the way of the polymerization process of the fluoride, the convex to which electrical charge is concentrated is removed and the deposition of the fluoride is densified and flattened as illustrated in FIG. 4B.

The present invention is not limited to the specifically disclosed embodiments and variations but may include other embodiments and variations without departing from the scope of the present invention.

What is claimed is:

1. A manufacturing method of a scale comprising:
   forming scale gratings by etching a layer that is formed on a face of a substrate, by using a plasma etching device, the substrate having scale gratings of a plurality of gratings arranged at a predetermined interval, and
   forming a protective layer on the face of the substrate by a plasma polymerization, the protective layer being made of fluoride and covering the scale gratings and an exposed portion of the face of the substrate,
   wherein, in forming of the protective layer, the protective layer is formed by a plasma polymerization of the fluoride gas, by changing an operation condition of the plasma etching device,
   wherein the etching and the plasma polymerization are continuously performed under a condition that vacuum atmosphere is kept, and
   wherein the same fluoride gas is used for the etching and the plasma polymerization,
   wherein the etching is changed into the forming of the protective layer, by changing a bias applied to a target of the plasma etching device.

2. The method as claimed in claim 1, wherein, in the forming of the protective layer, a surface of the protective layer is shaped into flat or approximately flat.

3. The method as claimed in claim 1, wherein:
in the forming of the scale gratings, the scale gratings are formed by performing the etching with use of a mask; and
the mask is removed by using the plasma etching device.

4. The method as claimed in claim 1, wherein the fluoride is a polymer of fluorocarbon.

5. The method as claimed in claim 1, wherein, in the forming of the protective layer, the fluoride is deposited so as not to protrude from an upper face of the scale gratings.

* * * * *